US009628331B2

(12) United States Patent
Irani et al.

(10) Patent No.: US 9,628,331 B2
(45) Date of Patent: Apr. 18, 2017

(54) REROUTING SERVICES USING ROUTING POLICIES IN A MULTIPLE RESOURCE NODE SYSTEM

(71) Applicant: INTERNATIONAL BUSINESS MACHINES CORPORATION, Armonk, NY (US)

(72) Inventors: Majid Irani, San Jose, CA (US); Donny R. Rota, Leominster, MA (US)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 14/306,623

(22) Filed: Jun. 17, 2014

(65) Prior Publication Data

US 2015/0365292 A1 Dec. 17, 2015

(51) Int. Cl.
H04L 12/28 (2006.01)
H04L 12/24 (2006.01)
H04L 12/751 (2013.01)

(52) U.S. Cl.
CPC ........ H04L 41/0813 (2013.01); H04L 41/044 (2013.01); H04L 41/0806 (2013.01); H04L 41/0856 (2013.01); H04L 41/12 (2013.01); H04L 41/18 (2013.01); H04L 45/02 (2013.01)

(58) Field of Classification Search
CPC ....... H04L 41/044; H04L 41/12; H04L 41/18; H04L 41/0856; H04L 41/0806; H04L 29/06
USPC .................. 370/351, 389; 715/735; 709/221
See application file for complete search history.

(56) References Cited

U.S. PATENT DOCUMENTS

| 7,822,594 | B2 | 10/2010 | Haviv et al. | |
|---|---|---|---|---|
| 8,126,135 | B2 | 2/2012 | Flores et al. | |
| 8,285,822 | B2 | 10/2012 | K. | |
| 8,321,558 | B1 | 11/2012 | Sirota et al. | |
| 2003/0137532 | A1* | 7/2003 | Proulx | H04L 29/06 715/735 |
| 2003/0189919 | A1* | 10/2003 | Gupta | H04L 41/044 370/351 |

(Continued)

OTHER PUBLICATIONS

Eilam, T. et al, "Managing the configuration complexity of distributed applications in Internet data centers," Communications Magazine, IEEE (vol. 44, Issue: 3), pp. 166-177, Mar. 2006.

Primary Examiner — Kyung H Shin
(74) Attorney, Agent, or Firm — Yudell Isidore PLLC

(57) ABSTRACT

A method, system and computer program product for configuring active resource nodes in a distributed computing system controlled by an administrative control module. The method includes identifying a first configuration of active resource nodes having at least two or more active resource nodes and detecting a modification of a link representing at least one connection between the active resource nodes. In response to detecting the modification of the link, a routing policy table is retrieved and a second configuration of the active resource nodes are identified from the routing policy table including at least one new connection between the two or more active resource nodes. The distributed computing system is triggered to configure the two or more active resource nodes according to the second configuration and to establish the at least one new connection between the two or more active resource nodes.

20 Claims, 8 Drawing Sheets

(56) References Cited

U.S. PATENT DOCUMENTS

2006/0123393 A1 6/2006 Atkins et al.
2008/0320482 A1 12/2008 Dawson et al.
2010/0332617 A1 12/2010 Goodwin et al.
2011/0307793 A1 12/2011 Leitner et al.

* cited by examiner

| Routing Policy 602 | Destination Node 604 | Service Node 1 606 | Service Node 2 608 | Service Node 3 610 | Current Configuration 612 |
|---|---|---|---|---|---|
| 1 | DestApp-1 | WAS-1 | LDAP-1 | DB2-1 | Yes |
| 2 | DestApp-1 | WAS-1 | LDAP-2 | DB2-2 | No |
| 3 | DestApp-1 | WAS-1 | LDAP-1 | DB2-3 | No |
| 4 | DestApp-1 | WAS-2 | LDAP-1 | DB2-2 | No |
| 5 | DestApp-1 | WAS-2 | LDAP-1 | DB2-1 | No |
| 6 | DestApp-1 | WAS-2 | LDAP-2 | DB2-2 | No |
| 7 | DestApp-1 | WAS-1 | LDAP-2 | DB2-3 | No |
| 8 | DestApp-2 | WAS-2 | LDAP-2 | DB2-2 | No |

Routing Policy Table 310

FIG. 6

REROUTING SERVICES USING ROUTING POLICIES IN A MULTIPLE RESOURCE NODE SYSTEM

BACKGROUND

1. Technical Field

The present invention generally relates to data processing systems. More specifically, the present invention relates to a system and method for rerouting active resource nodes using routing policies in a distributed computing system.

2. Description of the Related Art

Cloud and distributed computing systems use multiple service nodes to deliver services to end users through a communication network. Several different service nodes in the network may be able to provide different components of a service. There may be multiple nodes that are operable to provide the same components of the services. System administrators can change the service nodes used and the routing of connections between service nodes to control traffic to and from service nodes. Changes to service nodes and connections can be necessary in the event of a disaster affecting service nodes, performance degradation of a service node, the need to test service nodes, trouble shooting and load balancing. One problem in changing service nodes is to find a service path or route that meets client requirements.

BRIEF SUMMARY

Disclosed are a method, a system and a computer program product for configuring active resource nodes in a distributed computing system controlled by an administrative control module. The method includes identifying a first configuration of active resource nodes having at least two or more active resource nodes and detecting a modification of at least one link representing at least one connection between the active resource nodes. In response to detecting the modification of the link, the method includes retrieving a routing policy table and identifying a second configuration of the active resource nodes from the routing policy table that includes at least one new connection between the two or more active resource nodes. The distributed computing system is triggered to configure the two or more active resource nodes according to the second configuration and to establish the at least one new connection between the two or more active resource nodes.

The data processing system includes a distributed computing system including several resource nodes. An administrative control module is communicatively coupled to the distributed computing system. The administrative control module has at least one processor and at least one storage device having stored therein a re-routing software that causes the processor to: identify a first configuration of active resource nodes having at least two or more active resource nodes; and detect a modification of a link representing at least one connection between the active resource nodes. In response to detecting the modification of the link, the processor retrieves a routing policy table and identifies, from the routing policy table, a second configuration of the active resource nodes including at least one new connection between the two or more active resource nodes. The processor triggers the distributed computing system to (a) configure the two or more active resource nodes according to the second configuration and (b) establish the at least one new connection between the two or more active resource nodes.

The computer program product includes a computer readable storage device; and program code stored on the computer readable storage device that when executed by a processor of an administrative control computer having a network interface to a distributed computing system including several resource nodes causes the processor to: identify a first configuration of active resource nodes having at least two or more active resource nodes; and detect a modification of a link representing at least one connection between the active resource nodes. In response to detecting the modification of the link, the program codes causes the processor to retrieve a routing policy table and identify from the routing policy table a second configuration of the active resource nodes including at least one new connection between the two or more active resource nodes. The program code further causes the processor to trigger the distributed computing system to configure the two or more active resource nodes according to the second configuration and to establish the at least one new connection between the two or more active resource nodes.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments is to be read in conjunction with the accompanying drawings, wherein:

FIG. 6 illustrates a routing policy table used to configure active resource nodes, in accordance with one or more embodiments;

DETAILED DESCRIPTION

The illustrative embodiments provide a method, system and computer program product for configuring active resource nodes in a distributed computing system controlled by an administrative control module. The method includes identifying a first configuration of active resource nodes having at least two or more active resource nodes and detecting a modification of a link representing at least one connection between the active resource nodes. In response to detecting the modification of the link, the method includes retrieving a routing policy table and identifying a second configuration of the active resource nodes from the routing policy table that includes at least one new connection between the two or more active resource nodes. The distributed computing system is triggered to configure the two or more active resource nodes according to the second configuration and to establish the at least one new connection between the two or more active resource nodes.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
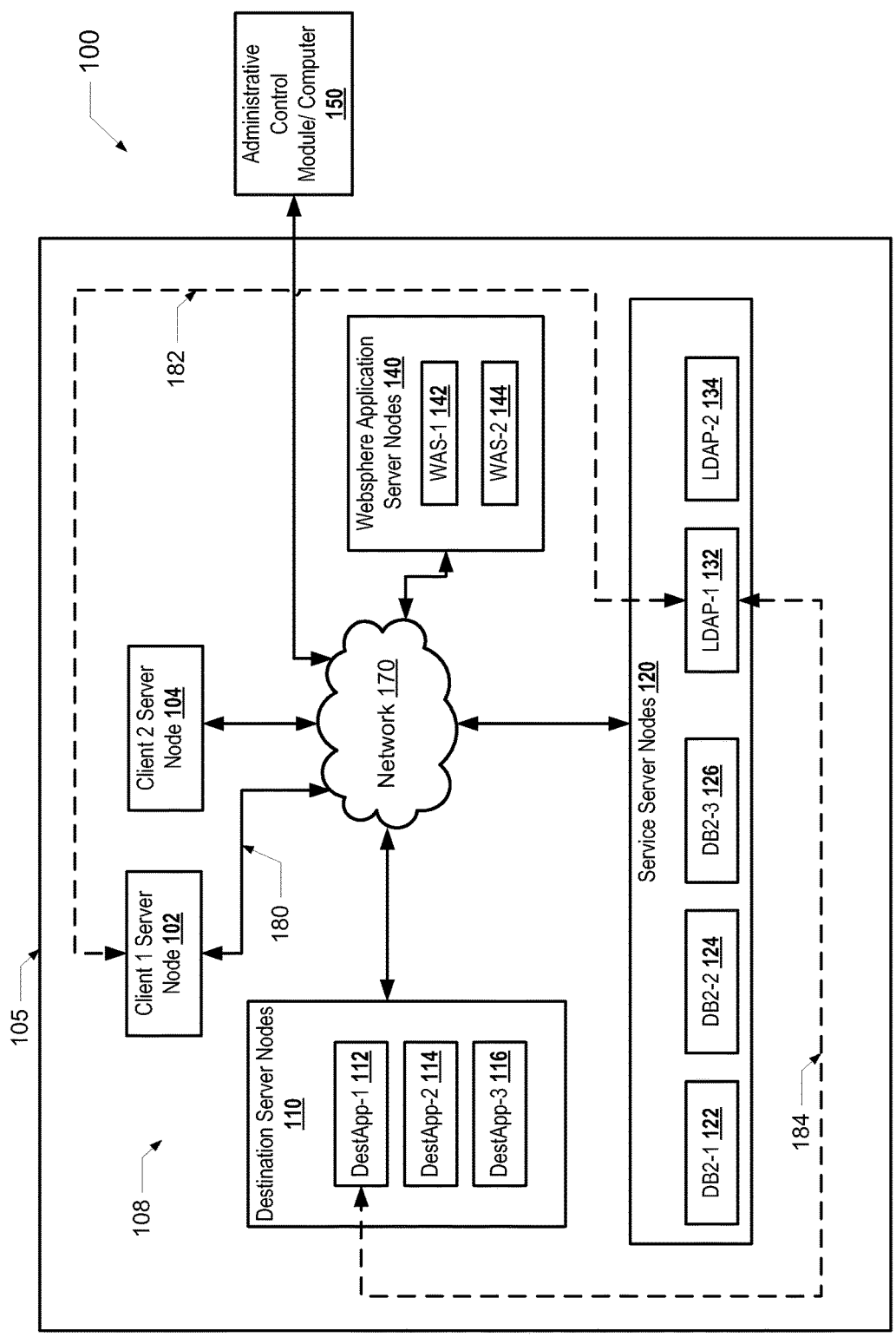
FIG. 1 provides a block diagram representation of an example distributed data processing system within which one or more of the described embodiments can be practiced.
Figure 2:
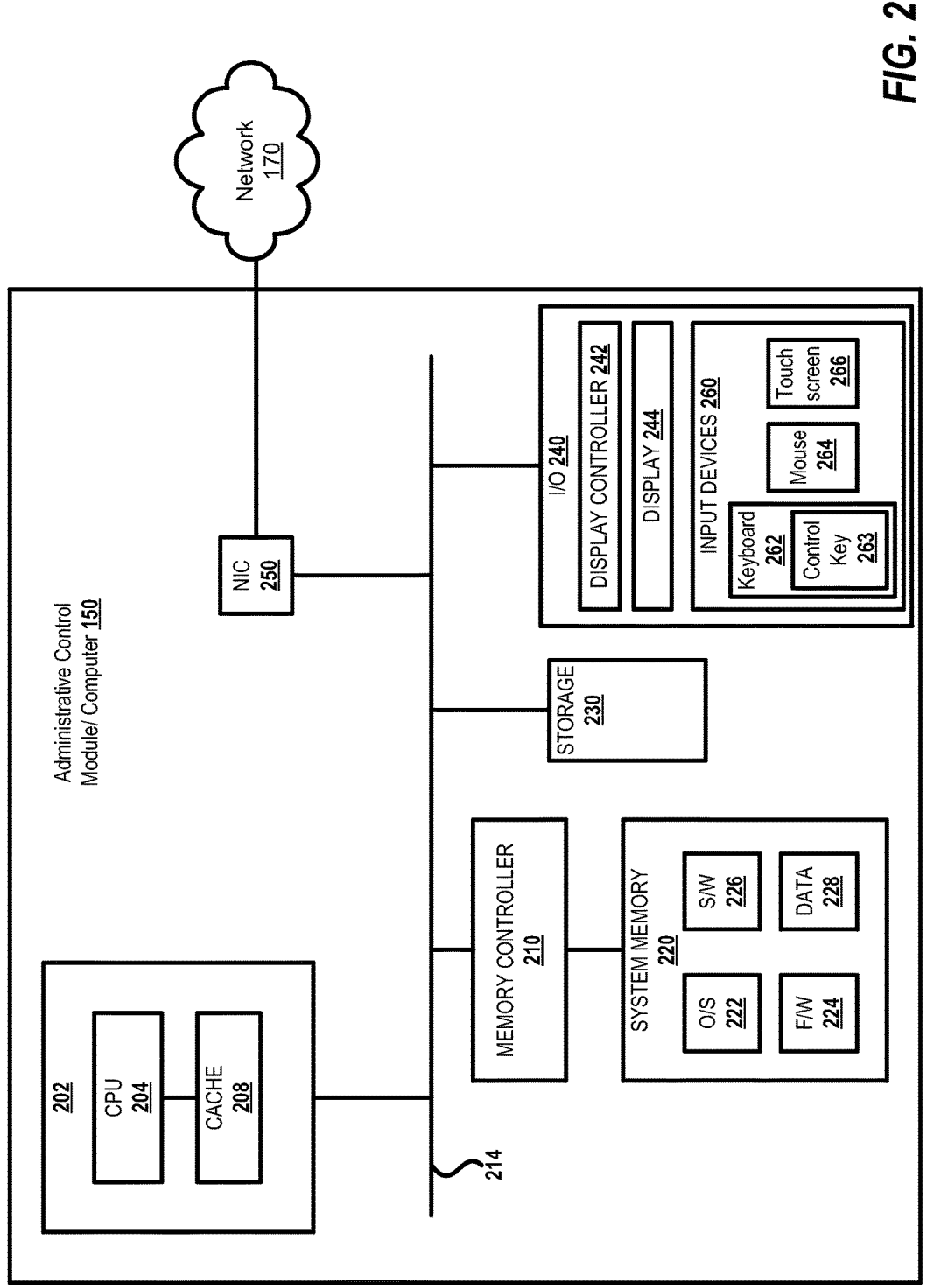
FIG. 2 provides a block diagram representation of an example administrative control computer in accordance with one or more embodiments.

Those of ordinary skill in the art will appreciate that the hardware components and basic configurations depicted in FIGS. 1-2 may vary. The illustrative components within distributed computing system (DCS) 100 and the other figures are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention.

With reference now to the figures, and beginning with FIG. 1, there is depicted a block diagram representation of an example distributed data processing system, within which one or more embodiments can be implemented.

FIG. 1 and the following discussion are intended to provide a brief, general description of an exemplary distributed computing system adapted to implement the described embodiments. While embodiments will be described in the general context of instructions residing on hardware within a server computer, those skilled in the art will recognize that some embodiments may be implemented in a combination of program modules running in an operating system. Generally, program modules include routines, programs, components, and data structures, which perform particular tasks or implement particular abstract data types. The described features of the disclosure may also be practiced in distributed computing environments where tasks are performed by remote processing devices that are linked through a communications network. In a distributed computing environment, program modules may be located in both local and remote memory storage devices.

Example distributed computing system (DCS) 100 comprises a data processing system (DPS) 105 that is controlled by an administrative control module executing within administrative control computer (ACM) 150. DPS 105 includes client 1 server node 102 and client 2 server node 104 that both access services through several resource nodes 108 which are interconnected by communication connections 180 via a communication network 170. Client 1 server node 102 and client 2 server node 104 are in communication with network 170 through communication connections 180. Each of the resource nodes 108 can be an independent computer system that can be selectively accessed through network 170 via communication connections 180. The resource nodes 108 include destination server nodes 110, service server nodes 120 and websphere application server (WAS) nodes 140. Example destination server nodes 110 comprise destination application (DestApp) 1 node 112, DestApp 2 node 114 and DestApp 3 node 116. The destination application nodes 112-116 contain application computing services that can be selectively accessed by clients within DCS 100 such as client 1 server node 102 and client 2 server node 104.

Service server nodes 120 contain servers that provide services. Service server nodes 120 include database server node 2-1 (DB2-1) 122, DB2-2 node 124 and DB2-3 node 126. Service server nodes 120 further include lightweight directory application protocol (LDAP) server LDAP-1 node 132 and LDAP-2 node 134. LDAP nodes 132 and 134 are server nodes that provide application protocols for accessing and maintaining distributed directory information services for clients. Clients access services via LDAP servers. For example, client 1 server node 102 accesses DestApp-1 node 112 through LDAP-1 node 132 via communication connections 182 and 184. Websphere application server (WAS) nodes 140 include WAS-1 server node 142 and WAS-2 sever node 144. WAS server nodes 142 and 144 are used to connect website users to applications or servlets.

DCS 100 further comprises an administrative control module/computer (ACM) 150 that controls the operation of DCS 100. ACM 150 is in communication with network 170 via a communication connection 180. ACM 150 can transmit commands and instructions to DPS 105 and receive data and information from DPS 105. In one embodiment, ACM 150 can configure the resource nodes 108 that are active based at least partially on a user input and can establish new connections 180 (and/or reconfigure the existing connections) between the active resource nodes.

FIG. 2 illustrates an example ACM 150 that can be described as having features common to a server computer. However, as used herein, the term "administrative control module/computer" is intended to include any type of computing device or machine that is capable of receiving, storing and running a software product and retrieving data/instructions from a storage device. Therefore the ACM 150 can include not only computer systems, but also devices such as communication devices and personal and home consumer devices that have multiple processors and/or processor cores. ACM 150 is configured as a stand-alone computer. ACM 150 comprises one or more processor modules or chips 202 that include one or more central processing units (CPUs), of which CPU 204 is illustrated. Throughout the description herein, the terms CPU and processor can be utilized interchangeably as referring to the same component. Processor chip 202 further includes a cache subsystem 208. Cache subsystem 208 can comprise one or more levels of caches, such as an L1 cache and an L2 cache, and one or more of the lower levels of caches can be a shared cache. Processor chip 202 is coupled to a system interconnect fabric 214 that couples other components of ACM 150 to processor chip 202. Interconnect fabric 214 in an embodiment can be an address and data bus.

System memory 220 is coupled to system interconnect fabric 214 via a memory controller 210. System memory 220 can include therein a plurality of modules and routines, including operating system (O/S) 222, firmware (F/W) 224, software (S/W) 226, and data 228. The various software and/or firmware modules have varying functionality when their corresponding program code is executed by CPU 204 within ACM 150.

ACM 150 can further include physical computer readable storage media 230 (or storage) such as hard disk drives. Storage media 230 can also include solid state storage devices, optical drives and other storage devices. ACM 150 can also include input/output devices and corresponding controllers, generally represented as I/O 240, and a network interface card (NIC) 250, among other components. NIC 250 enables ACM 150 to connect to and communicate with other remote devices and networks, such as network 170. I/O 240 can include a display controller 242 that is in communication with one or more display(s) 244. Display controller 242 is a graphics or video controller that can control at least a portion of the content shown on display(s) 244. I/O 240 can further include input devices 260 such as a keyboard 262, mouse 264 and touch screen 266 that allow a user to make selections and provide input to ACM 150. Keyboard 262 has a control key 263. In one embodiment, keyboard 262, mouse 264 and touch screen 266 can be used to perform select and move operations, which are visually shown on display 244 and referred to as drag-and-drop in some instances. In alternate instances, where menu lists can be provided with a right click of the pointer controller or other form of manual or other selection (e.g., voiced commands), the selection of a specific one or more links and move of the selected one or more links to another location within the graphical user interface (GUI) can be completed differently from the commonly known drag and drop operation. All such methods of link or node selection and manipulation or movement of links across nodes within the GUI fall within the scope of the disclosure.

Figure 3:
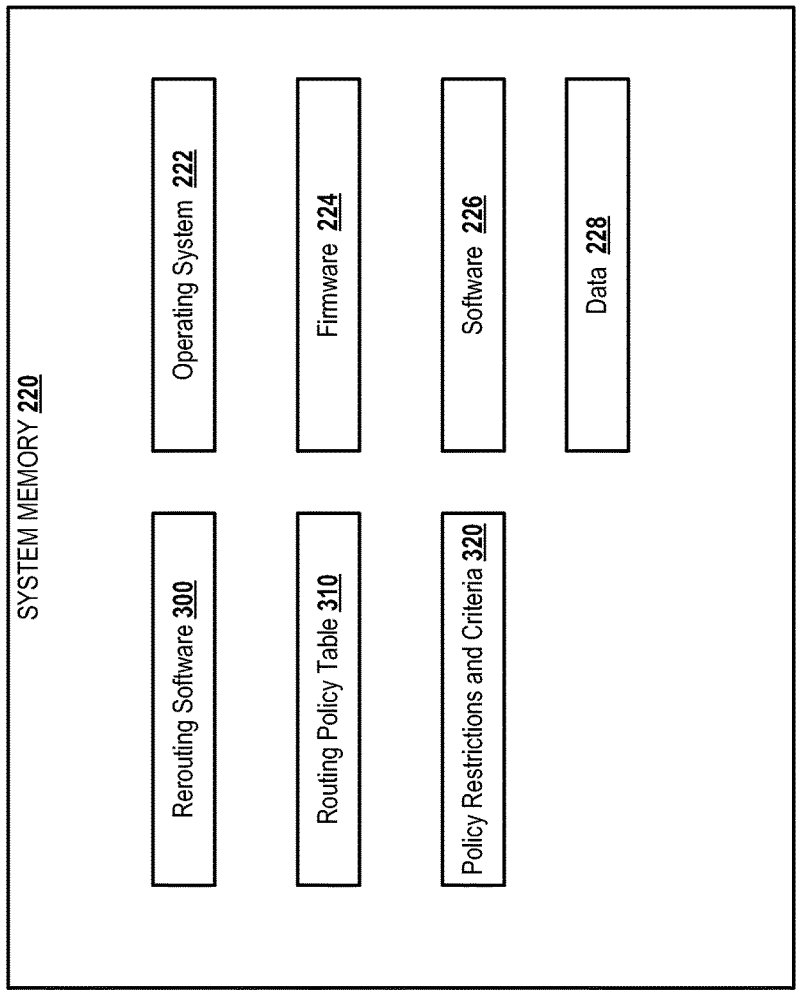
FIG. 3 illustrates a block diagram of example contents of a system memory of the example administrative control computer of FIG. 2, in accordance with one or more embodiments.

FIG. 3 illustrates example contents of system memory 220. In the discussion of FIG. 3, reference is also made to elements described in FIG. 2. Operating system (O/S) 222, firmware (F/W) 224, software (S/W) 226 and data 228 can be stored in and retrieved from system memory 220 through the operation of read and write commands. Functions, modules, routines, methods and processes of the present disclosure can be provided as firmware code and/or logic stored on system memory 220 and executed on processor module 202. System memory 220 also includes rerouting software 300, routing policy table 310 and policy restrictions and criteria 320. Rerouting software 300 executing on processor 102 automatically configures connections 180 between resource nodes 108 after detecting a modification or redirection of a link representing at least one connection 180 between at least two of the active resource nodes. Routing policy table 310 is a pre-determined table that contains the specific configuration of connections 180 that can be established within DCS 100 to route services between the various resource nodes 108. Policy restrictions and criteria 320 contain rules and criteria that govern how routing policy table 310 is applied and used by rerouting software 300.

Figure 4A:
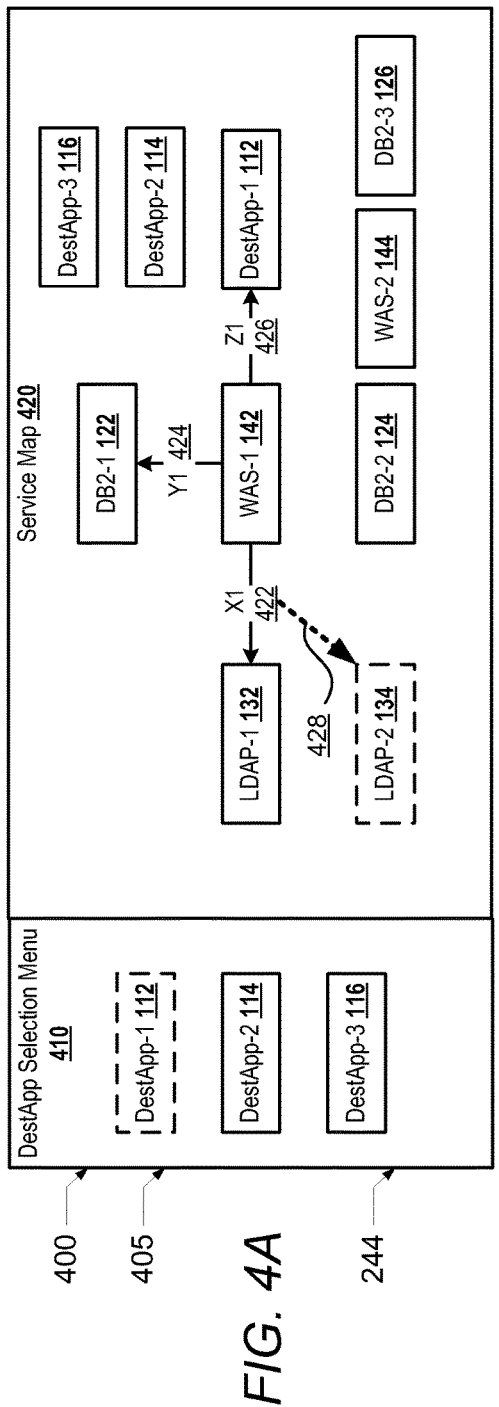
FIG. 4A illustrates a service map of active and available resource nodes in a distributed computing system showing the selection of a link to be rerouted in accordance with one or more embodiments.
Figure 4B:
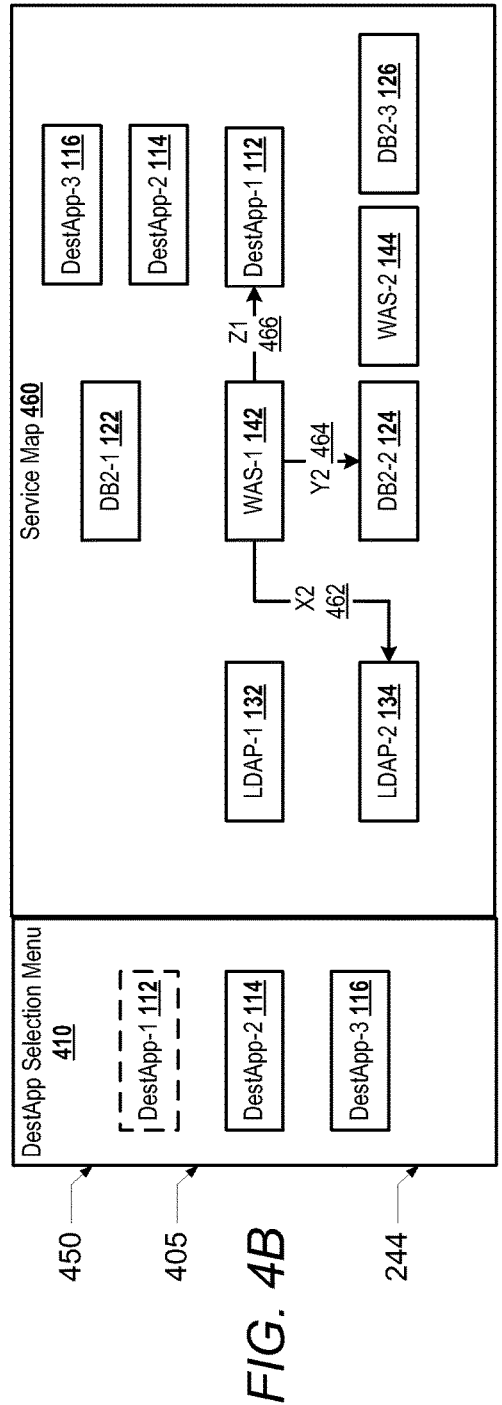
FIG. 4B illustrates a service map of active and available resource nodes in a distributed computing system showing the configuration of connections after the link rerouting has been completed, in accordance with one or more embodiments.

FIGS. 4A and 4B illustrate example resource node configurations 400 and 450 respectively, displayed in a graphical user interface (GUI) 405 that can be presented on display 244. In the discussion of FIGS. 4A and 4B, reference is also made to elements described in FIG. 1 and FIG. 2. FIG. 4A comprises resource node configuration 400 that includes a destination application selection menu 410 and a service map 420. Destination application selection menu 410 contains several destination application nodes including DestApp 1 node 112, DestApp 2 node 114 and DestApp 3 node 116. The destination application nodes 112-116 contain computing services that can be selectively accessed by a system administrator or user. The system administrator can select one or more destination application nodes 112-116 from destination application selection menu 410 using an input device 260. In FIG. 4A, DestApp 1 node 112 has been selected by the user and is indicated by dashed lines.

Service map 420 contains a graphical representation of the physical topology of the available resource nodes 108 and their connections 180 within DPS 105. The resource nodes 108 shown on service map 420 include destination application nodes DestApp 1 node 112, DestApp 2 node 114 and DestApp 3 node 116 and database server node DB2-1 122, DB2-2 node 124 and DB2-3 node 126. The resource nodes 108 shown on service map 420 further include lightweight directory application protocol (LDAP) nodes, LDAP-1 node 132 and LDAP-2 node 134, and websphere application nodes, WAS-1 node 142 and WAS-2 node 144. Several of the resource nodes 108 are current active resource nodes and are in communication with each other via network 170. WAS-1 node 142 is active and communicatively connected to LDAP-1 node 132 via a communication connection X1 422. WAS-1 node 142 is active and communicatively connected to DB2-1 node 122 via a communication connection Y1 424. WAS-1 node 142 is active and communicatively connected to DestApp-1 node 112 via a communication connection Z1 426.

A system administrator can modify a first configuration of active resource nodes, e.g., resource node configuration 400, and connections between the active resource nodes by selecting and moving (e.g., via a drag and drop operation) a link 428 representing at least one connection between the active resource nodes (i.e. WAS-1 node 142 and LDAP-1 node 132 via connection X1 422). The system administrator can drag and drop the link 428 using one of input devices 260. As shown in FIG. 4A, the user has selected connection X1 422 and has dragged the link 428 to LDAP-2 134 as indicated by dashed lines.

In other embodiments, other forms of manual or other selection techniques (e.g., voice commands), the selection of link 428 and move of the selected link 428 to another location within GUI 405 can be completed differently from the commonly known drag and drop operation. All such methods of link or node selection and manipulation or movement of links across nodes 108 within GUI 405 fall within the scope of the disclosure.

After a modification of the link 428 has been detected, the rerouting software 300 executing on processor 202 automatically reroutes or configures the connections 180 between the active resource nodes 108 based upon the modification of the link 428 and the routing policy table 310. Turning to FIG. 4B, when a modification of the link 428 has been detected, the rerouting software 300 executing on processor 102 retrieves routing policy table 310 and identifies from the routing policy table 310 a second configuration 450 of the active resource nodes including at least one new connection X2 462 between the two or more active resource nodes (i.e. WAS-1 node 142 and LDAP-2 node 134). Processor 202 triggers the distributed computing system 105 to reroute or configure the active resource nodes according to the second configuration 450 and to establish the at least one new connection X2 462 between the active resource nodes WAS-1 node 142 and LDAP-2 node 134. Service map 460 shows the graphical representation of the physical topology of the second configuration 450 including the new connection X2 462.

The modification of link 428 to a resource node enables a client (i.e., client 1 server node 102) to connect to a destination application (i.e., DestApp-1 112) to perform a specific client interaction. The interlinking of resource nodes 108 based on routing policy table 310 provides the required/requested client services from the various resource nodes 108 available within DCS 100. The resource nodes 108 provide multiple/redundant services and can be linked together in multiple different configurations to support the services requested by the client.

Figure 5A:
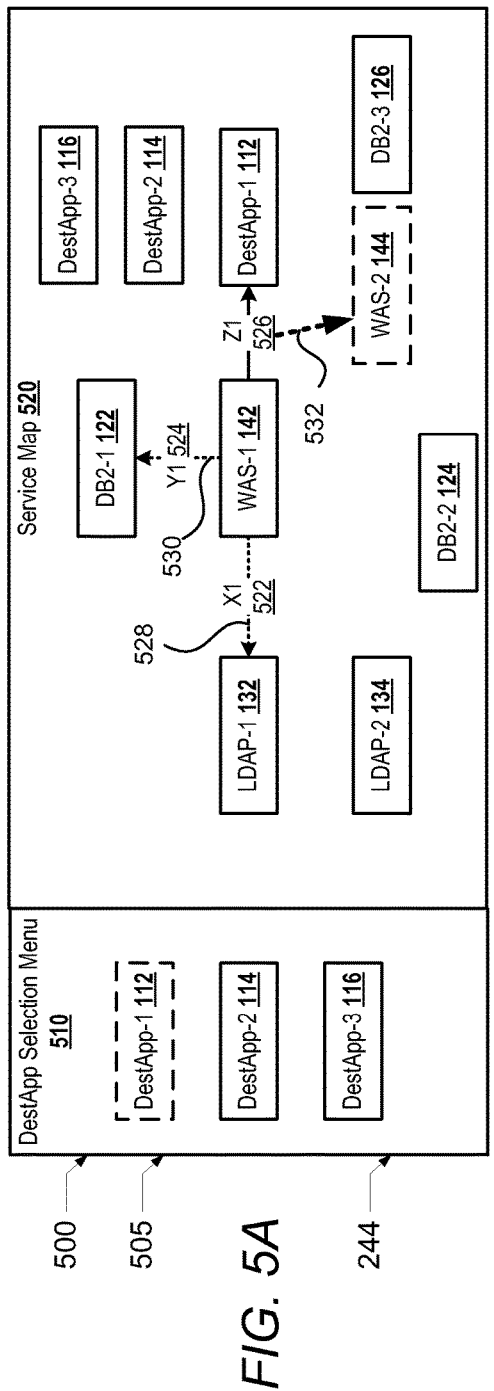
FIG. 5A illustrates a service map of active and available resource nodes in a distributed computing system showing the selection of multiple links to be rerouted in accordance with one or more embodiments.
Figure 5B:
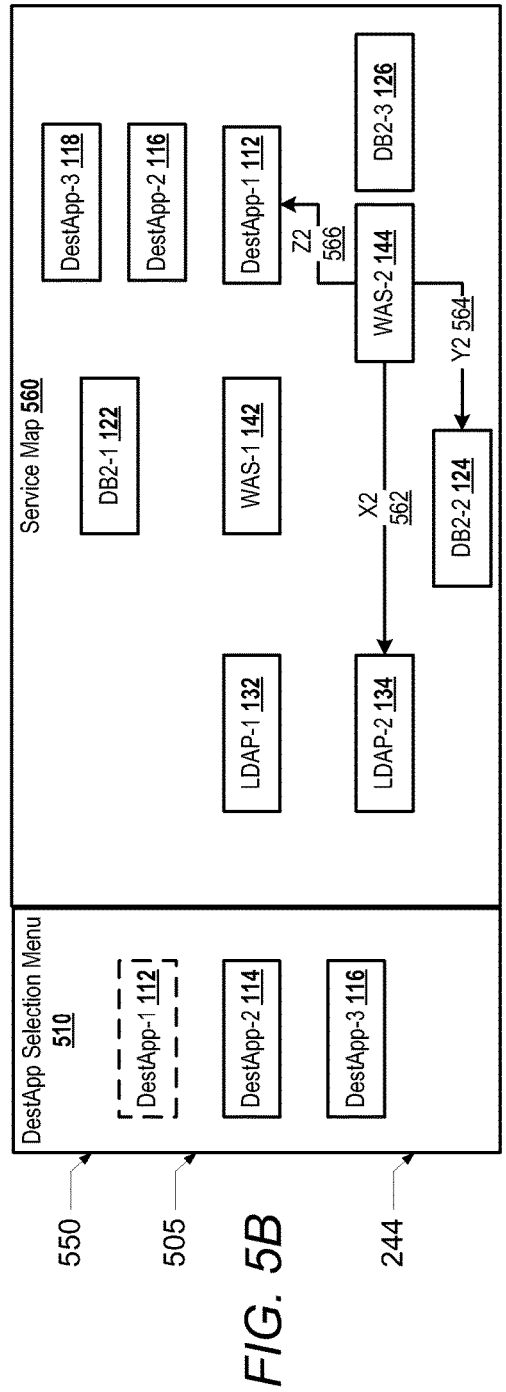
FIG. 5B illustrates a service map of active and available resource nodes in a distributed computing system showing the configuration of connections after the multiple link rerouting has been completed, in accordance with one or more embodiments.

FIGS. 5A and 5B illustrate example resource node configurations 500 and 550 displayed in a graphical user interface 505 that can be shown on display 244. In the discussion of FIGS. 5A and 5B, reference is also made to elements described in FIG. 1 and FIG. 2. FIG. 5A comprises resource node configuration 500 that includes a destination application selection menu 510 and a service map 520. Destination application selection menu 510 contains several destination application nodes including DestApp 1 node 112, DestApp 2 node 114 and DestApp 3 node 116. The destination application nodes 112-116 contain computing services that can be selectively accessed by a system administrator or user. The system administrator can select one or more destination application nodes 112-116 from destination application selection menu 510 using an input device 260 (FIG. 2). In FIG. 5A, DestApp-1 node 112 has been selected by the user and is indicated by dashed lines.

Service map 520 contains a graphical representation of the physical topology of the available resource nodes 108 and their connections 180 within DPS 105. The resource nodes 108 shown on service map 520 include destination application nodes DestApp-1 node 112, DestApp-2 node 114 and DestApp-3 node 116 and database server nodes DB2-1 122, DB2-2 node 124 and DB2-3 node 126. The resource nodes 108 shown on service map 520 further include lightweight directory application protocol nodes, LDAP-1 node 132 and LDAP-2 node 134 and websphere application nodes WAS-1 node 142 and WAS-2 node 144. Several of the resource nodes 108 have been pre-determined to be active resource nodes and are in communication via network 170. WAS-1 node 142 is active and communicatively connected to LDAP-1 node 132 via a communication connection X1 522. WAS-1 node 142 is active and communicatively connected to DB2-1 node 122 via a communication connection Y1 524. WAS-1 node 142 is active and communicatively connected to DestApp-1 node 112 via a communication connection Z1 526.

A system administrator can modify a first configuration 500 of active resource nodes and connections between the active resource nodes by selecting one or more links, e.g., links 528, 530, and selecting and moving (e.g., via a drag and drop of) a link 532. The links represent connections that can be rerouted or modified. Link 528 represents a connection between WAS-1 node 142 and LDAP-1 node 132 via connection X1 522. Link 530 represents a connection between WAS-1 node 142 and DB2-1 node 122 via connection Y1 524. Link 532 represents a connection between WAS-1 node 142 and DestApp-1 node 112 via connection Z1 526. In one embodiment, the system administrator can depress a control key 263 on keyboard 262 to sequentially select multiple links. After the control key 263 has been depressed and held, a first manipulation of a selection affordance device (i.e., mouse 264) is used to select link 528 representing connection X1 522 to be modified. After depressing and holding the control key 263 again, a second manipulation of a selection affordance device (i.e., mouse 264) is used to select link 530 representing connection Y1 524 to be modified. The system administrator can then select and move (e.g., drag and drop) a link 532 representing connection Z1 526 using one of input devices 260 (i.e., mouse 264). As shown in FIG. 5A, the user has selected connection Z1 526 and has moved (via drag and drop of) the link 532 to WAS-2 144, as indicated by dashed lines. The move operation terminates on a destination active resource node (i.e., WAS-2 144), while each of the plurality of links (i.e., links 528, 530 and 532) are selected.

After modification of the links have been detected, the rerouting software 300 executing on processor 202 automatically reroutes or modifies each of the new connections 180 through the destination active resource node based on the selected and moved links and the pre-determined routing policy table 310. Turning to FIG. 5B, when a selection and modification of several links (i.e., links 528, 530 and 532) has been detected, the rerouting software 300 executing on processor 202 retrieves routing policy table 310 and identifies from the routing policy table 310 a second configuration 550 of the active resource nodes including the new connection X2 562 between WAS-2 node 144 and LDAP-2 node 134, new connection Y2 564 between WAS-2 node 144 and DB2-2 node 124 and new connection Z2 566 between WAS-2 node 144 and DestApp1 node 112. Processor 202 triggers DPS 105 to reroute or configure the active resource nodes according to the second configuration 550 and to establish the new connections X2 562, Y2 564 and Z2 566 between the active resource nodes. Service map 560 shows the graphical representation of the physical topology of the second configuration 550 including the new connections X2 562, Y2 564 and Z2 566.

FIG. 6 illustrates routing policy table 310 that is stored in system memory 220. Routing policy table 310 is a pre-determined table that contains the specific configuration of connections 180 that can be established within DPS 100 to route services between the various resource nodes 108. Routing policy table 310 is used by rerouting software processor 202 to reroute connections between resource nodes 108 of the DPS 105. Routing policy table 310 stores the possible node combinations that can be used to physically connect resource nodes and deliver services that are associated with each resource node. In one embodiment, additional policy restrictions and criteria 320 can be applied to routing policy table 310 to select a combination of nodes based on desired criteria.

Routing policy table 310 comprises columns 610 of routing policy numbers 602, destination nodes 604, resource service nodes 1 606, 2 608, 3 610 and current configuration 612. Routing policy numbers 602 identify the specific allowed configuration in each row 620. Destination nodes 604 contain application computing services desired to be accessed by clients 102 and 104. Resource service nodes 1 606, 2 608 and 3 610 contain services associated with the delivery of the application computing services. Current configuration 612 identifies whether the configuration of resource nodes is the currently used configuration.

Figure 7:
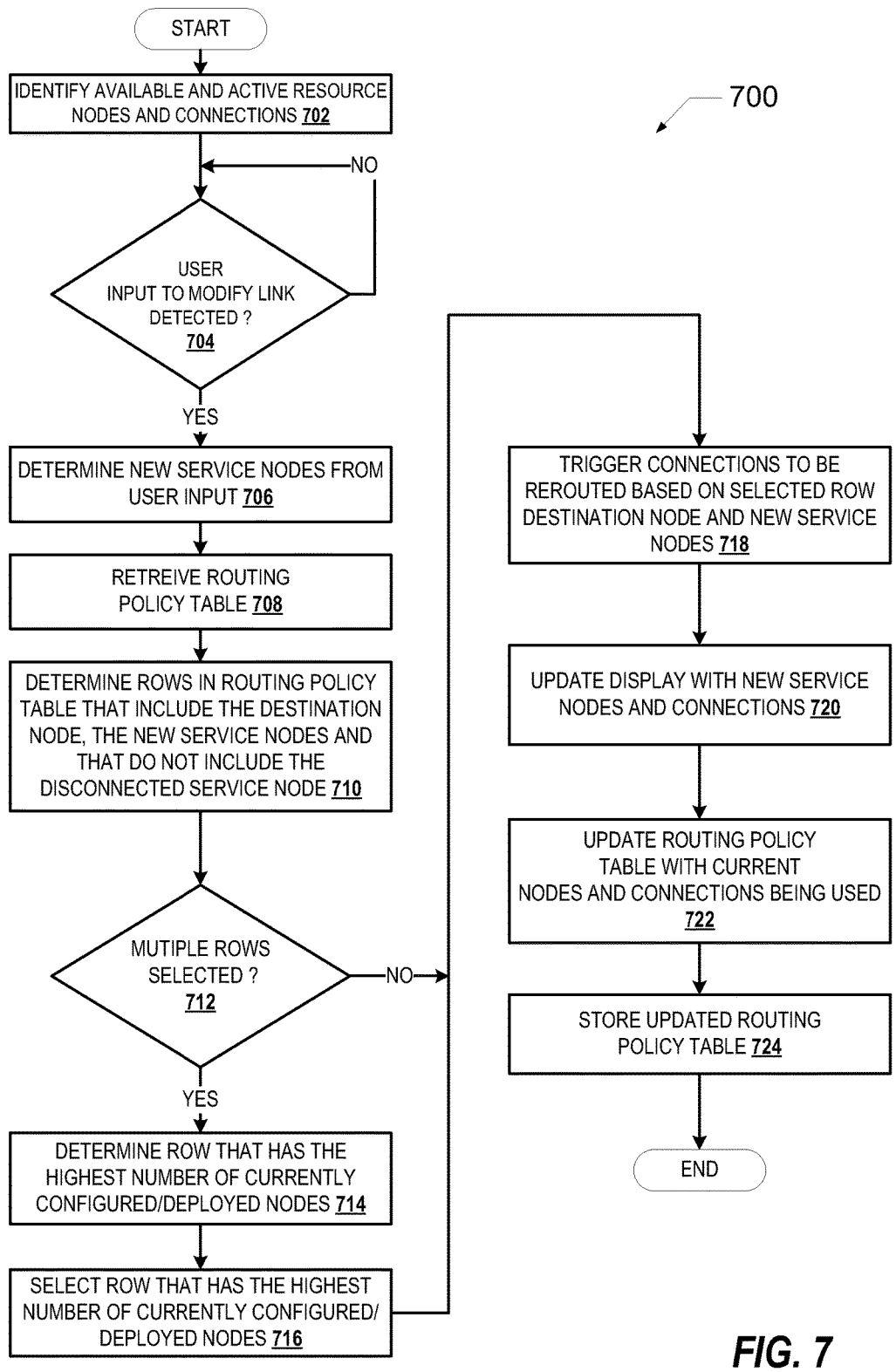
FIG. 7 is a flow chart illustrating a method for configuring active resource nodes in a distributed computing system when a single link is selected to be rerouted, according to one or more embodiments.

FIG. 7 illustrates a flowchart of an example method for configuring active resource nodes in a distributed computing system when a single link is selected to be rerouted. Computer implemented method 700 can be implemented in ACM 150. The description of the method is provided with general reference to the specific components illustrated within the preceding figures. In the discussion of FIG. 7, reference is also made to elements described in FIGS. 1-6. Generally the method is described as being implemented via processor 202 and particularly by the execution of rerouting software 300 within processor 202. It is however appreciated that certain aspects of the described methods may be implemented via other processing devices and/or execution of other code.

Method 700 begins at the start block and proceeds to block 702 where processor 202 identifies the available and active resource nodes 108 and connections 180 within DPS 105. The available and active resource nodes and connections correspond to the first configuration 400 (FIG. 4A). At decision block 704, processor 202 detects if a user has provided input to modify a link 428. The user input is provided by selecting and moving (drag-and-drop) the link 428 representing at least one connection between the active resource nodes (i.e., WAS-1 node 142 and LDAP-1 node 132 via connection X1 422 in FIG. 4A). The user can drag and drop the link 428 using one of input devices 260 (i.e., mouse 264). In response to detecting that a user has not provided input to modify a link, processor 202 continues to detect user input at block 704.

In response to detecting that a user has provided input to modify a link, processor 202 determines the new service nodes from the user input (block 706) and retrieves the routing policy table 310 from system memory 220 (block 708). Processor 202 determines rows 620 in the routing policy table 310 that include the destination node and the new service nodes, and rows that do not include the disconnected service node (block 710). Each row 620 in routing policy table 310 corresponds to a second configuration 450 of the active resource nodes including at least one new connection X2 462 between the two or more active resource nodes (i.e., WAS-1 node 142 and LDAP-2 node 134).

At decision block 712, processor 202 determines if multiple rows 620 from routing policy table 310 were selected at block 710. In response to determining that multiple rows 620 from routing policy table 310 were selected at block 710, in one embodiment, processor 202 determines which row 620 has the highest number of currently configured/deployed resource nodes 108 (block 714) and selects the row 620 having the highest number of currently configured/deployed resource nodes 108 (block 716). In another embodiment, policy restrictions and criteria 320 can be used to determine which specific row to select from among multiple rows 620. In one embodiment, policy restrictions and criteria 320 can include a weighted scale to select a row with nodes that have a larger resource capacity. In another embodiment, policy restrictions and criteria 320 can include criteria that enforce selecting a row that has the fewest number of communication connection changes to achieve the desired reconfiguration action.

After block 716 has been completed and also in response to determining that multiple rows 620 from routing policy table 310 have not been selected (at block 712), processor 202 triggers the DPS 105 to reroute or reconfigure the active resource nodes according to the selected row 620 (e.g., second configuration 450). Processor 202 establishes the at least one new connection X2 462 between the active resource nodes (i.e. WAS-1 node 142 and LDAP-2 node 134) (block 718). Processor 202 updates the display 244 with the new second configuration 450 of destination nodes, service nodes and connections (i.e., service map 460) (block 720). Processor 202 updates the routing policy table 310 with the current second configuration 450 of destination nodes, service nodes and connections (block 722) and then stores the updated routing policy table 310 to system memory 220 (block 724). Method 700 then ends.

Figure 8:
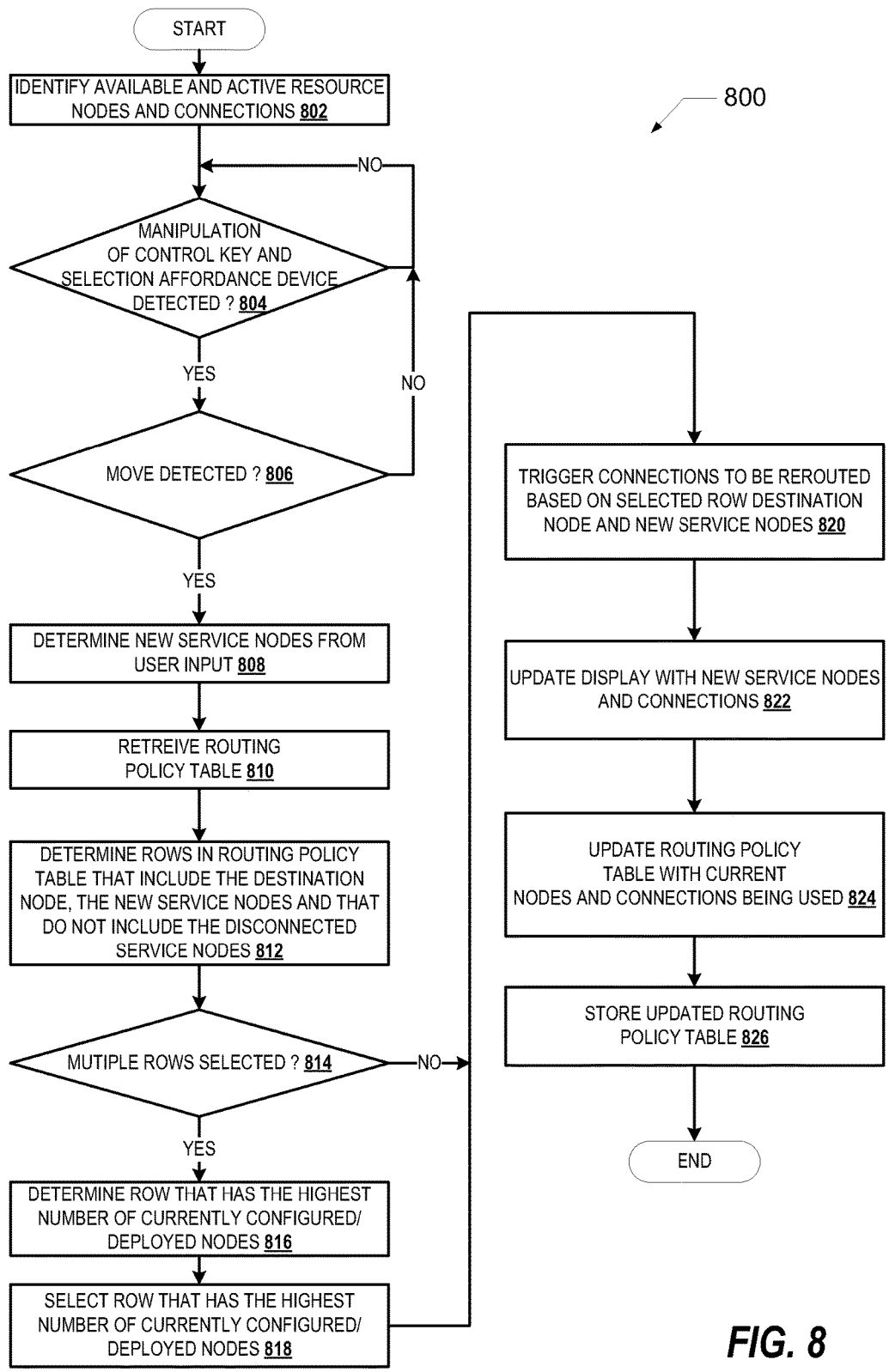
FIG. 8 is a flow chart illustrating a method for configuring active resource nodes in a distributed computing system when more than one link is selected to be rerouted, according to one or more embodiments.

FIG. 8 illustrates a flowchart of an exemplary method for configuring active resource nodes in a distributed computing system when multiple links are selected to be rerouted. Computer implemented method 800 can be implemented in ACM 150. The description of the method is provided with general reference to the specific components illustrated within the preceding figures. In the discussion of FIG. 8, reference is also made to elements described in FIGS. 1-6. Generally the method is described as being implemented via processor 202 and particularly by the execution of rerouting software 300 within processor 202. It is however appreciated that certain aspects of the described methods may be implemented via other processing devices and/or execution of other code.

Method 800 begins at the start block and proceeds to block 802 where processor 202 identifies the available and active resource nodes 108 and connections 180 within DPS 105. The available and active resource nodes and connections correspond to the first configuration 500 (FIG. 5A). At decision block 804, processor 202 detects if a user has provided input to modify multiple links 528, 530 and 532 to change the interconnection between multiple resource nodes 108. The user input can be provided by depression of control key 263 on keyboard 262 and selection of multiple links. After the control key 263 has been depressed and held, a first manipulation of a selection affordance device (i.e., mouse 264) is used to select link 528 representing connection X1 522 to be modified. After depressing and holding the control key 263 again, a second manipulation of the selection affordance device (i.e., mouse 264) is used to select link 530 representing connection Y1 524 to be modified. After depressing and holding the control key 263 again, a third manipulation of the selection affordance device (i.e., mouse 264) is used to select link 532 representing connection Z1 526 to be modified.

In response to detecting manipulation of control key 263 and selection affordance device 264, processor 202 detects if a user has further performed a move operation (drag and drop) on a link (i.e., link 532 representing connection Z1 526) using mouse 264 (decision block 806). As shown in FIG. 5A, the user has selected connection Z1 526 and has moved (drag and drop) the link 532 to WAS-2 144 as indicated by dashed lines. The link 532 is moved to another active resource node (i.e. WAS-2 144) while each of the plurality of links (i.e., links 528, 530 and 532) are selected. The user can modify the first configuration 500 of active resource nodes and connections between the active resource nodes by selecting multiple links 528, 530 and 532 and moving (drag and drop) link 532. The links represent connections that can be rerouted or modified. Link 528 represents a connection between WAS-1 node 142 and LDAP-1 node 132 via connection X1 522. Link 530 represents a connection between WAS-1 node 142 and DB2-1 node 122 via connection Y1 524. Link 532 represents a connection between WAS-1 node 142 and DestApp-1 node 112 via connection Z1 526. In response to detecting that a user has not manipulated a control key or selection affordance device (decision block 804) or moved links (decision block 806), processor 202 continues to detect user input at decision block 804.

In response to detecting that a user has provided input to modify multiple links at decision block 806, processor 202 determines the new service nodes from the user inputs (block 808) and retrieves the routing policy table 310 from system memory 220 (block 810). Processor 202 determines the rows 620 in the routing policy table 310 that include the destination node and the new service nodes and that do not include the disconnected service node (block 812). Each row 620 in routing policy table 310 corresponds to a second configuration 550 of the active resource nodes including multiple new connections X2 562, Y2 564 and Z2 566 between the resource nodes.

At decision block 814, processor 202 determines if multiple rows 620 from routing policy table 310 were selected at block 812. In response to determining that multiple rows 620 from routing policy table 310 were selected at block 812, in one embodiment, processor 202 determines which row 620 has the highest number of currently configured/deployed resource nodes 108 (block 816) and selects the row 620 having the highest number of currently configured/deployed resource nodes 108 (block 818). In another embodiment, policy restrictions and criteria 320 can be used to determine which specific row to select from among multiple rows 620.

After block 818 has been completed and also in response to determining that multiple rows 620 from routing policy table 310 have not been selected (at decision block 814), processor 202 triggers the DPS 105 to reroute or reconfigure the active resource nodes according to the nodes in the selected row 620 (i.e., second configuration 550). Processor 202 establishes the multiple new connections X2 562, Y2 564 and Z2 566 between the active resource nodes (block 820). New connection X2 562 connects WAS-2 node 144 and LDAP-2 node 134. New connection Y2 564 connects WAS-2 node 144 and DB2-2 node 124. New connection Z2 566 connects WAS-2 node 144 and DestApp1 node 112.

Processor 202 updates the display 244 with the new configuration 550 of destination nodes, service nodes and connections (i.e. service map 560) (block 822). Processor 202 updates the routing policy table 310 with the current second configuration 550 of destination nodes, service nodes and connections (block 824) and stores the updated routing policy table 310 to system memory 220 (block 826). Method 800 then ends.

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of configuring a plurality of resource nodes in a distributed computing system that includes an administrative control module, the method comprising:
   identifying a first configuration of active resource nodes having at least two active resource nodes;
   detecting a modification of an existing link representing at least one connection between the at least two active resource nodes; and
   in response to detecting the modification of the link:
      retrieving a routing policy table;
      determining whether the routing policy table has more than one second configuration of the at least two active resource nodes;
      in response to determining the routing policy table does not have more than one second configuration of the at least two active resource nodes, identifying, from the routing policy table, a second configuration of the at least two active resource nodes including at least one new connection between the at least two active resource nodes;

in response to determining that the routing policy table has more than one second configuration of the at least two active resource nodes, selecting, as the second configuration, a particular configuration from among the more than one second configurations that has a highest number of currently configured resource nodes;

triggering the distributed computing system to configure the at least two active resource nodes according to the second configuration; and establishing the at least one new connection between the at least two active resource nodes.

2. The method of claim 1, wherein detecting the modification of the link further comprises:

detecting a select and move of a visual representation of the link between the at least two active resource nodes from a first active resource node to a second active resource node.

3. The method of claim 1, further comprising:

updating a display with the second configuration showing one or more modified connections between the at least two active resource nodes.

4. The method of claim 1, further comprising:

detecting a modification of a plurality of links representing a plurality of connections between the at least two active resource nodes; and in response to detecting the modification of the plurality of links:

retrieving a routing policy table;

identifying from the routing policy table a third configuration of the active resource nodes including a plurality of new connections between the at least two active resource nodes; and triggering the distributed computing system to configure the at least two active resource nodes according to the third configuration and to establish the plurality of new connections between the at least two active resource nodes.

5. The method of claim 4, wherein detecting the modification of the plurality of links further comprises:

detecting a manipulation of a control key;

detecting a first manipulation of a selection affordance device to select a first link to an active resource node;

detecting a second manipulation of the selection affordance device to select a second link to an active resource node;

detecting a move operation terminating on a destination active resource node while each of the plurality of links are selected; and automatically rerouting each of the new connections through the destination active resource node.

6. The method of claim 1, further comprising:

updating the routing policy table with the second configuration and the connections between active resource nodes being used; and storing the updated routing policy table.

7. The method of claim 1, wherein selecting the particular configuration as the second configuration further comprises:

selecting the particular configuration as the second configuration based on the particular configuration having at least one of:

a largest resource capacity from among the more than one second configurations; and a fewest number of communication changes to the at least two active resource nodes from among the more than one second configurations.

8. A data processing system comprising:

a distributed computing system including a plurality of resource nodes;

an administrative control module communicatively coupled to the distributed computing system, the administrative control module having at least one processor and at least one storage device having stored therein a rerouting software that causes the processor to:

identify a first configuration of active resource nodes having at least two active resource nodes;

detect a modification of an existing link representing at least one connection between the at least two active resource nodes; and in response to detecting the modification of the link:

retrieve a routing policy table;

determine whether the routing policy table has more than one second configuration of the at least two active resource nodes;

in response to determining the routing policy table does not have more than one second configuration of the at least two active resource nodes, identify, from the routing policy table, a second configuration of the at least two active resource nodes including at least one new connection between the at least two active resource nodes;

in response to determining that the routing policy table has more than one second configuration of the at least two active resource nodes, select, as the second configuration, a particular configuration from among the more than one second configurations that has a highest number of currently configured resource nodes;

trigger the distributed computing system to configure the at least two active resource nodes according to the second configuration; and establishing the at least one new connection between the at least two active resource nodes.

9. The data processing system of claim 8, wherein detecting the modification of the link further comprises the rerouting software further configuring the processor to:

detecting a select and move of a visual representation of the link between the at least two active resource nodes from a first active resource node to a second active resource node.

10. The data processing system of claim 8, wherein the rerouting software further configures the processor to:

update a display with the second configuration showing one or more modified connections between the at least two active resource nodes.

11. The data processing system of claim 8, wherein the rerouting software further configures the processor to:

detect a modification of a plurality of links representing a plurality of connections between the at least two active resource nodes; and in response to detecting the modification of the plurality of links:

retrieve a routing policy table;

identify from the routing policy table a third configuration of the active resource nodes including a plurality of new connections between the at least two active resource nodes; and trigger the distributed computing system to configure the at least two active resource nodes according to the third configuration and to establish the plurality of new connections between the at least two active resource nodes.

12. The data processing system of claim 11, wherein detecting the modification of the plurality of links further comprises the rerouting software further configuring the processor to:
   detect a first manipulation of a selection affordance device to select a first link to an active resource node;
   detect a second manipulation of the selection affordance device to select a second link to an active resource node;
   detect a move operation terminating on a destination active resource node while each of the plurality of links are selected; and
   automatically rerouting each of the new connections through the destination active resource node.

13. The data processing system of claim 8, wherein the rerouting software further configures the processor to:
   update the routing policy table with the second configuration and the connections between active resource nodes being used; and
   store the updated routing policy table.

14. The data processing system of claim 8, wherein selecting the particular configuration as the second configuration further comprises the rerouting software further configuring the processor to:
   select the particular configuration as the second configuration based on the particular configuration having at least one of:
      a largest resource capacity from among the more than one second configurations; and
      a fewest number of communication changes to the at least two active resource nodes from among the more than one second configurations.

15. A computer program product comprising:
   a computer readable storage device; and
   program code stored on the computer readable storage device that when executed by a processor of an administrative control computer having a network interface to a distributed computing system including a plurality of resource nodes causes the processor to:
      identify a first configuration of active resource nodes having at least two active resource nodes;
      detect a modification of a link representing at least one connection between the at least two active resource nodes;
      in response to detecting the modification of the link:
         retrieve a routing policy table;
         determine whether the routing policy table has more than one second configuration of the at least two active resource nodes;
         in response to determining the routing policy table does not have more than one second configuration of the at least two active resource nodes, identify, from the routing policy table, a second configuration of the at least two active resource nodes including at least one new connection between the at least two active resource nodes;
         in response to determining that the routing policy table has more than one second configuration of the at least two active resource nodes, select, as the second configuration, a particular configuration from among the more than one second configurations that has a highest number of currently configured resource nodes;
         trigger the distributed computing system to configure the at least two active resource nodes according to the second configuration; and
         establish the at least one new connection between the at least two active resource nodes.

16. The computer program product of claim 15, wherein detecting the modification of the link further comprises program code on the computer readable storage device that when executed by the processor operates to:
   detect a select and move of a visual representation of the link between the at least two active resource nodes from a first active resource node to a second active resource node.

17. The computer program product of claim 15, further comprising program code on the computer readable storage device that when executed by the processor operates to:
   update a display with the second configuration showing one or more modified connections between the at least two active resource nodes.

18. The computer program product of claim 15, further comprising program code on the computer readable storage device that when executed by the processor operates to:
   detect a modification of a plurality of links representing a plurality of connections between the at least two active resource nodes; and
   in response to detecting the modification of the plurality of links:
      retrieve a routing policy table;
      identify from the routing policy table a third configuration of the active resource nodes including a plurality of new connections between the at least two active resource nodes; and
      trigger the distributed computing system to configure the at least two active resource nodes according to the third configuration and to establish the plurality of new connections between the at least two active resource nodes.

19. The computer program product of claim 18, wherein detecting the modification of the plurality of links further comprises program code on the computer readable storage device that when executed by the processor operates to:
   detect a first manipulation of a selection affordance device to select a first link to an active resource node;
   detect a second manipulation of the selection affordance device to select a second link to an active resource node;
   detect a move operation terminating on a destination active resource node while each of the plurality of links are selected; and
   automatically rerouting each of the new connections through the destination active resource node.

20. The computer program product of claim 15, wherein selecting the particular configuration as the second configuration further comprises program code on the computer readable storage device that when executed by the processor operates to:
   select the particular configuration as the second configuration based on the particular configuration having at least one of:
      a largest resource capacity from among the more than one second configurations; and
      a fewest number of communication changes to the at least two active resource nodes from among the more than one second configurations.

* * * * *